H. B. FULLER.
SCAFFOLD.
APPLICATION FILED JAN. 12, 1909.
1,018,658.
Patented Feb. 27, 1912.
3 SHEETS—SHEET 1.
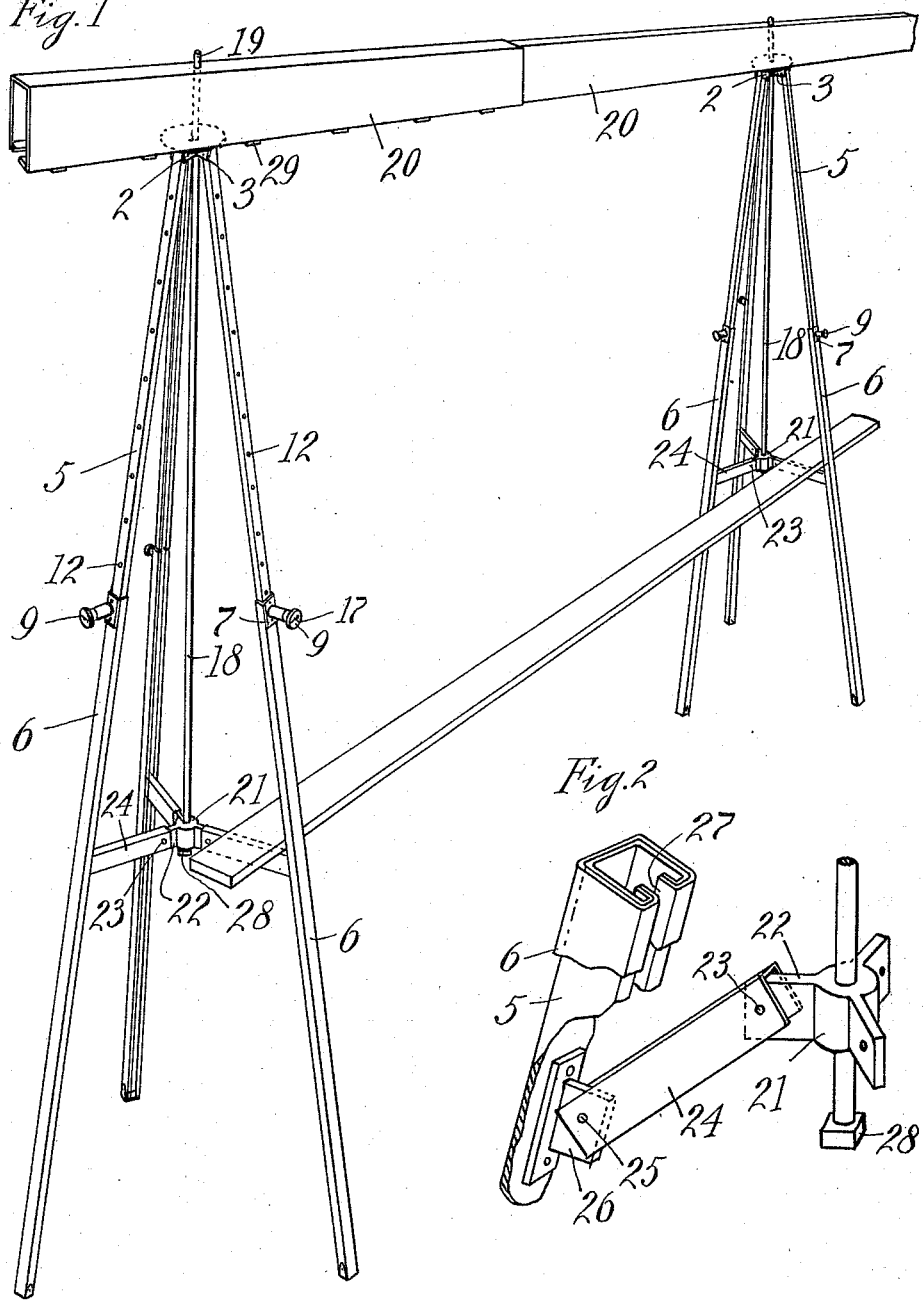
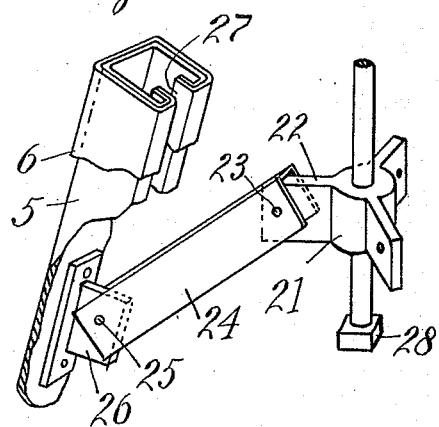
Witnesses,
George Voelker
H. Smith
Inventor,
Harvey B. Fuller
by Lothrop Johnson
his Attorneys H. B. FULLER.
SCAFFOLD.
APPLICATION FILED JAN. 12, 1909.
1,018,658.
Patented Feb. 27, 1912.
3 SHEETS—SHEET 2.
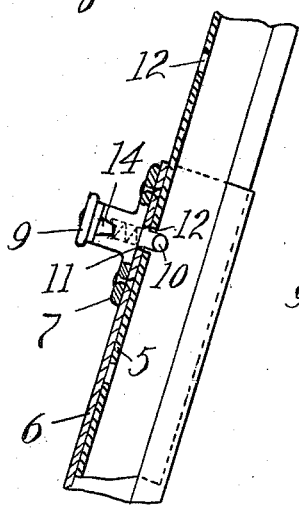
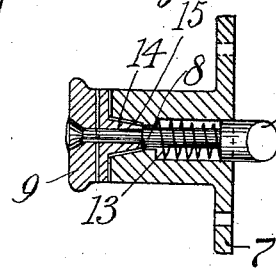
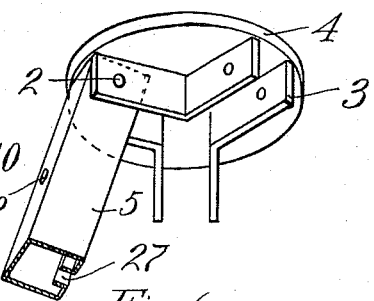
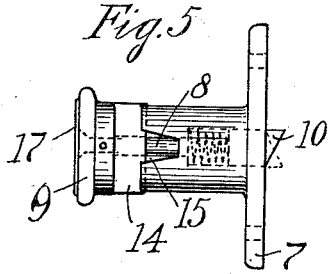
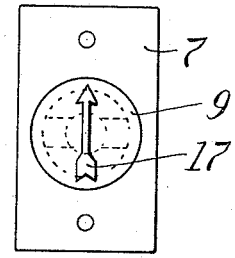
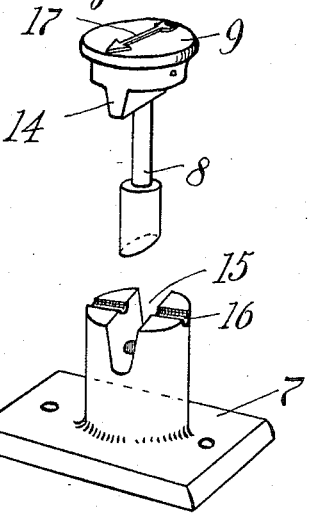
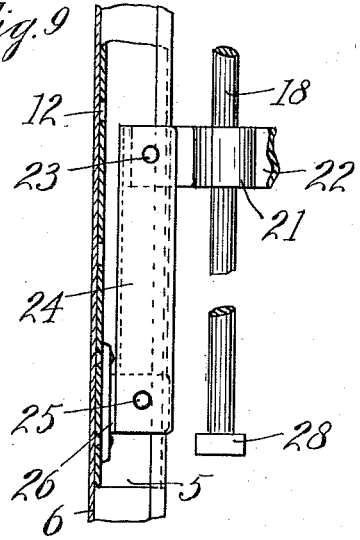
Witnesses
George Voelker
J. H. Smith
Inventor
Harvey B. Fuller
by Lothrop Johnson
his Attorneys H. B. FULLER.
SCAFFOLD.
APPLICATION FILED JAN. 12, 1909.
1,018,658.
Patented Feb. 27, 1912.
3 SHEETS—SHEET 3.
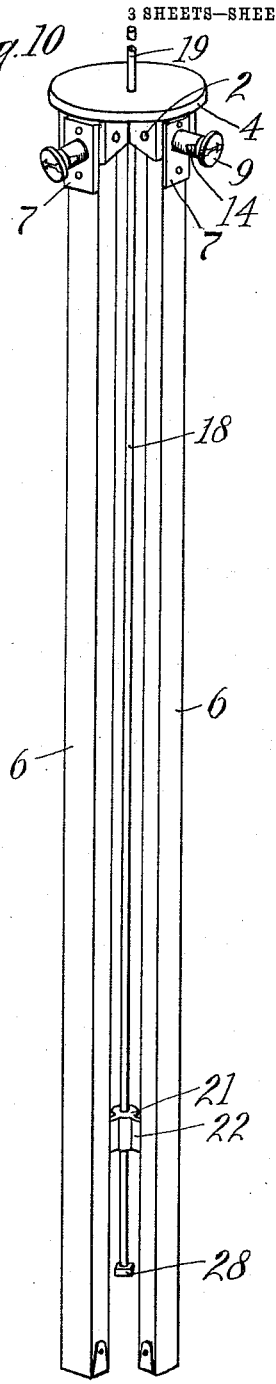
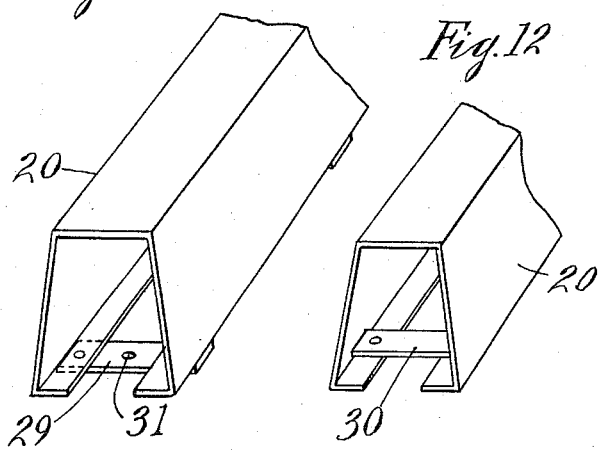
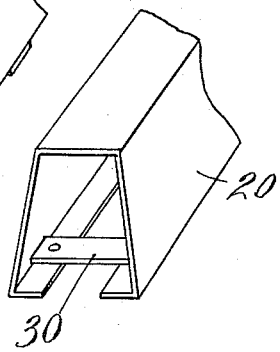
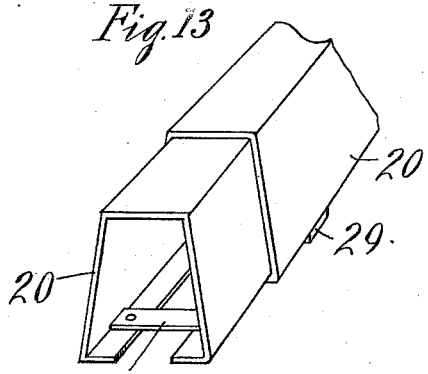
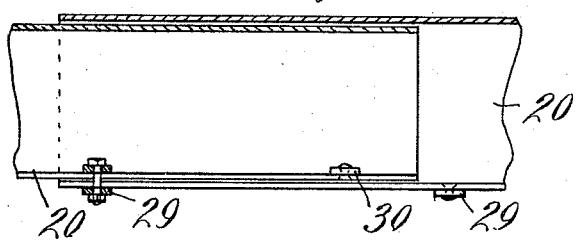
Witnesses,
George Voelker
H. Smith
Inventor,
Harvey B. Fuller
by Lothrop & Johnson
his Attorneys.

UNITED STATES PATENT OFFICE.

HARVEY B. FULLER, OF ST. PAUL, MINNESOTA.

SCAFFOLD.

1,018,658.  Specification of Letters Patent.  Patented Feb. 27, 1912.

Application filed January 12, 1909. Serial No. 471,868.

*To all whom it may concern:*

Be it known that I, HARVEY B. FULLER, a citizen of the United States, residing at St. Paul, in the county of Ramsey and State of Minnesota, have invented certain new and useful Improvements in Scaffolds, of which the following is a specification.

My invention relates to improvements in workmen's scaffold or platforms of the class wherein foldable adjustable supports for the platform are used, its object being particularly to provide improvements in the adjusting and folding features of the scaffold supports.

To this end my invention consists in the features of construction and combination hereinafter particularly described and claimed.

In the accompanying drawings forming part of this specification, Figure 1 is a perspective view of a pair of my supports shown in connection with a scaffold cross bar, Fig. 2 is a perspective view of a portion of one of the scaffold supports, Fig. 3 is a longitudinal section through the telescoping ends of one of the scaffold support legs, Fig. 4 is a longitudinal sectional view of a locking device for the scaffold supports, Figs. 5 and 6 are side and top views, respectively, of the same, Fig. 7 is a side view of the locking device with the members shown separated, Fig. 8 is a bottom view of the top plate of one of the scaffold supports, Fig. 9 is a longitudinal section through a portion of one of the legs of one of the scaffold supports, Fig. 10 is a side view of one of the scaffold supports folded, Figs. 11, 12 and 13 are perspective views of a cross bar adapted to be used in connection with my improved form of support, and Fig. 14 is a longitudinal section of the telescoping cross bars shown in Fig. 13.

As shown in the drawings my improved platform supports consist each of a plurality of legs having pivotal support 2 at their upper ends in flanges 3 upon the under side of the head piece 4. The legs are made up of members 5 and 6, the members 5 being slidable within the members 6. Carried by the outer end of each member 6 is a locking device shown specifically in Figs. 3 to 7. This consists of a base 7 suitably secured to the outer sides of the member 6, and in coöperation therewith a plunger 8. The plunger 8 is carried by a head 9 and extends through a central opening in the base, the inner end 10 of the plunger extending through an opening 11 in the member 6 and one of a series of openings 12 in the member 5. A coil spring 13 is interposed between the stop 10 on the end of the plunger and the inner wall of the base 7. As shown best in Fig. 7 the head 9 is formed with a cross rib 14 fitted to a transverse groove 15 in the top of the base 7, the base top being also formed with a shallow groove 16 at right angles to the groove 15 in which the rib 14 may be inserted to hold the head and plunger retracted as indicated in Fig. 5, the stop 10 being inclined at its free end so that, as hereinafter pointed out, the stop may be set to allow the sections 5 and 6 of the legs to be freely moved in one direction while preventing their movement in the opposite direction. The head 9 of the plunger preferably carries an arrow 17 by which the position of the stop is indicated.

Centrally arranged with reference to each series of legs is a rod 18 preferably extending through the head 4 and platform cross bars 20. Slidable upon the lower end of the rod is a collar 21 having outwardly directed flanges 22 each flange having pivotal connection 23 with a link 24, the opposite end of said link having pivotal connection 25 with a bracket 26 secured to the inner side of the adjacent leg member 6. The links 24 extend through corresponding slots 27 in the inner sides of the leg members 5 and 6. The rod 18 carries upon its lower end a nut 28 forming a support as indicated in Fig. 1 for the collar 22 when the links are extended, the said nut also, as shown in Fig. 10 holding the lower ends of the legs from being carried far enough inward when the device is folded to wedge the links within the slots 27.

In Figs. 11 to 14 is shown a form of platform bar particularly coöperating with my improved form of support. As shown the platform bar consists of similar telescoping members 20, the members 20 being of bent sheet metal open along the bottom and with cross bars 29 across the outside of the bottom wall of the larger member 20 and cross bars 30 inside the bottom wall of the smaller member. This allows the members of the platform bar to slide together as indicated best in Fig. 13. I provide openings 31 through the cross bars 29 to receive the pin 19 and arrange, as shown in Fig. 1, said cross bars a desired distance apart.

When the lock is supported in partly retracted position as shown in Fig. 5 the stop 10 as shown will project far enough through the leg sections to catch and support the inner leg section when moved in one direction while allowing it to freely slide past and depress the stop when moved in the other direction. When the leg sections are adjusted to the desired relative position the lock will be turned into the position indicated in Fig. 4 in which position the stop extends so far through the inner leg section as to prevent its sliding in either direction.

By having the brace links 24 extend through slots in the inner sides of both inner and outer leg members and supported at their inner ends upon the inner walls of the inner leg members it will be evident that a braced support for the links 24 is secured preventing twisting, and strengthening the union of the legs and brace links.

I claim as my invention:

1. In a platform support of the class described, the combination of two extensible and foldable tripod stands with central top spindles, a sheet metal beam member normally bent a rectangular shape in cross section, a slot opening in the lower surface of said beam, a plurality of sheet metal cross braces on the inside of the lower surface of said beam, one end of which is riveted to one of said flanges and the other end of which is riveted to the other flange, an orifice in the center of one of the end cross-braces, a registering orifice in the top surface of said beam, said orifices seating said beam on one of the aforementioned tripod spindles, a second metal beam member of slightly less dimensions than first mentioned beam member, normally bent rectangular in cross section, an orifice in said second beam member to seat on the spindle of the second tripod and a slot in the lower surface of said second beam member registering with the slot in said first mentioned beam member, the said second beam member adapted to snugly slide into said first mentioned beam member, substantially as described.

2. In a tripod platform support, the combination of a three membered folding leg brace, said leg brace having outer leg attaching members, said leg attaching members composed of an integral leg attaching plate and a cross-arm attaching member protruding from the center thereof, an inner center brace rod attaching member, said brace rod member composed of an integral sleeve portion and three protruding cross-arm attaching legs, and a cross arm sheet metal member, said cross arm member bent into ∩-shape, and said open portion of said cross arm fitting over and pivotally connecting said aforementioned inner and outer members, substantially as described.

In testimony whereof I affix my signature in presence of two witnesses.

HARVEY B. FULLER.

Witnesses:
H. S. JOHNSON,
H. SMITH.

---

Copies of this patent may be obtained for five cents each, by addressing the "Commissioner of Patents, Washington, D. C."